United States Patent [19]

Wells et al.

[11] 3,917,449

[45] Nov. 4, 1975

[54] POLYTHIOUREAS TO INHIBIT OZONE FADING OF DYED POLYAMIDES

[75] Inventors: Rodney Lee Wells, Chester; Robert Alden Lofquist, Richmond; Stanley David Lazarus, Petersburg, all of Va.

[73] Assignee: Allied Chemical Corporation, Petersburg, Va.

[22] Filed: Feb. 11, 1974

[21] Appl. No.: 441,595

[52] U.S. Cl. .................. 8/165; 8/74; 117/138.8 N
[51] Int. Cl.² ........................................... D06P 5/02
[58] Field of Search ........... 8/165, 74; 117/138.8 N Primary Examiner—Lewis T. Jacobs
Attorney, Agent, or Firm—Richard A. Anderson

[57] ABSTRACT

When from about 0.5 percent to about 5 percent of a polythiourea is coated on nylon fiber an improved dye fastness is achieved compared to untreated dyed nylon fiber when this fiber is exposed to ozone.

10 Claims, No Drawings

POLYTHIOUREAS TO INHIBIT OZONE FADING OF DYED POLYAMIDES

BACKGROUND OF THE INVENTION

The object of this invention is to reduce or prevent the fading of dyed nylon fabrics, such as nylon carpets, caused by ozone.

Ozone is generally present in air at sea level at concentrations of only 1 to 5 parts per hundred million (pphm). Only under conditions of heavy smog, where sunlight acts on a combination of unburned hydrocarbons from gasoline and oxides of nitrogen, does the ozone concentration exceed these concentrations. However, ozone fading occurs even at the low ozone concentrations, if the humidity is high enough (e. g., over 75% R.H.).

Ozone is a molecular form of oxygen which has three atoms of oxygen instead of the normal two atoms of oxygen per molecule. It is a very powerful oxidizing agent and a strong electrophilic reagent, that is, it searches out and attacks electron pairs such as exist with carbon-carbon double bonds.

Dyes have a multiplicity of double bonds, and perhaps for this reason are very sensitive to ozone.

The dyes in nylon which are most seriously attacked are those which are mobile in the nylon, such as disperse dyes. Cationic dyes are also susceptible. The most sensitive dyes are anthraquinone based, particularly blue dyes having an anthraquinone nucleus, although there is evidence that under high humidity and high ozone concentration almost all dyes are affected by ozone.

High humidity is necessary to cause noticeable ozone fading. Apparently moisture permits the dye to have sufficient mobility to diffuse to the surface of the yarn where the destruction of the dye occurs.

A number of chemicals have been called antiozonants in the literature which protect rubber from ozone. Examples are paraphenylenediamine derivatives, and dihydroquinoline derivatives. In nylon, however, these chemicals seriously discolor the yarn, especially after exposure to light, severely limiting the use of such materials.

Substituted thioureas are disclosed to prevent ozone fading in pending Ser. No. 402,543, filed Oct. 1, 1973 and in Ser. No. 255,628, filed May 26, 1972 now U.S. Pat. Ser. No. 3,822,996, July 9, 1974. The most pertinent prior art is U.S. Pat. No. 3,632,363 to Moussalli. This patent discloses the use of a diallyl substituted dithiourea linked by alkyl having 0 to 18 carbon atoms. However, applicants have, in their broadest claim, the proviso that when the polythiourea contains only two thiourea moieties and is allyl substituted, then the thioureas must be joined by a difunctional fatty acid residue moiety of 24 to 108 carbon atoms or a difunctional alkyl substituted cyclic aliphatic hydrocarbon. Applicants have found a much superior effect on resistance to ozone fading than the minor improvement shown in U.S. Pat. No. 3,632,363.

A method has been found for improving fastness of dyes when exposed to ozone in polycarbonamide fibers. The method consists of coating the fibers with a polythiourea having the formula

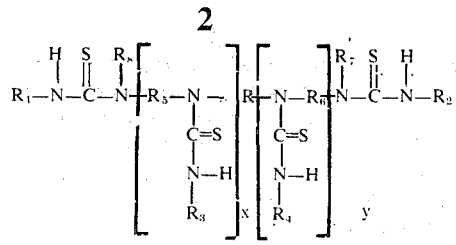

where $x$ and $y$ equal 0, 1 or 2, R is a difunctional aliphatic hydrocarbon radical or

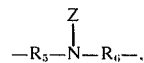

where Z is H or

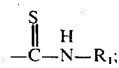

$R_1$, $R_2$, $R_3$, or $R_4$ are independently selected from phenyl or a monofunctional allyl or alkyl radical of 1 to 12 carbon atoms, $R_5$ and $R_6$ are $(CH_2)_2$, $(CH_2)_3$ or

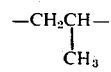

$R_7$, $R_8$ are independently selected from H or monofunctional allyl or alkyl radical of 1 to 12 carbon atoms, provided that when $x = 0$ and $R_1$ and $R_2$ are allyl then R must be a difunctional fatty acid residue moiety of 24 to 108 carbon atoms or a difunctional alkyl substituted cyclic aliphatic hydrocarbon, so that from about 0.5 to about 5 percent on weight of the fiber of the compound remains on the fiber after subsequent water treatment to substantially reduce the rate of failure due to exposure of fabric of the dyed fiber due to ozone. The polythioureas of this invention are incorporated in the spin finish, in the over-finish prior to dyeing or sprayed in solutions onto the dyed fiber of nylon 6 or nylon 66. These polythioureas, substantative for polycarbonamide and water-insoluble, remain with the fiber or yarn after subsequent water treatment such as scouring and/or shampooing and compete with the dye for the ozone, thus decreasing the rate of destruction of the dye. The rate of fading of the dye in nylon fiber, particularly disperse or cationic anthraquinone dyes, is substantially reduced by the incorporation or coating of these polythioureas. This reduction of fading is particularly useful in dyed carpets.

DESCRIPTION OF THE PREFERRED EMBODIMENTS

Some of the preferred embodiments of this invention are set forth in the following examples. The method of testing for ozone fading is similar to the AATCC Test 129–1968 set forth on page 334/15 of *The Journal of American Association of Textile Chemists and Colorists*, July 30, 1969, Volume 1, No. 16, in an article entitled, "A New Test Method for Ozone Fading at High Humidity," by Victor S. Salvin.

The method and the means of measuring the loss of dye consists in dyeing the yarn with a selected dye or dyes, exposing it to ozone at a concentration of 20 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a $\Delta E$ of 2.8, compared to the unexposed standard.

$\Delta E$ is a measure of the change of color between two samples, a smaller $\Delta E$ being a closer match, or less fading of one sample compared to the second sample.

This color difference, $\Delta E$ was measured with a Hunterlab Color Differenced Meter. This instrument measures color as seen in average daylight in a manner similar to the way in which the human eye responds to the stimulus of color. Experimentation has shown that the eye can match any color with a combination of three "primary" colored lights, and therefore, that any color can be specified by a three dimensional identification. The Color Difference Meter measures the light reflected by a specimen through filters that correspond to the three primary lights. These measurements made correspond to the way the average human eye responds to light. $\Delta E = \sqrt{(\Delta L)^2 + (\Delta a)^2 + (\Delta b)^2}$
where
$\Delta L$ is $L_1 - L_2$
$\Delta a$ is $a_1 - a_2$
$\Delta b$ is $b_1 - b_2$
and L, a, and b are readings on the Hunterlab Color Difference Meter.

L is a 100 to 0 reading of white to black;

*a* indicates redness when positive, gray when zero, and green when negative;

b indicates yellow when positive, gray when zero and blue when negative.

The following are examples of the additives and the methods of application onto yarns and exposure to ozone.

EXAMPLE 1

Polymer mad from caprolactam, having a formic acid viscosity of 67, about 66 carboxyls and about 17 amine ends per million grams of polymer was spun into yarn. The yarn coated with a commercial aqueous finish was drawn at a draw ratio of 2.7. The yarn had a Y cross section with a 3.0 modification ratio and each filament has a denier of 15. The yarn was chopped into 7 inch lengths, carded and spun into staple yarn having a cotton count of 2. The yarn was knitted into sleeves.

The sleeves were cut into sections about 15 inches long and weighed. The sleeves were then sprayed with an isopropanol solution of the materials shown below, at 1 gram per 100 milliliters of isopropanol. The control sleeve was sprayed with pure isopropanol. The sleeves were allowed to dry overnight and were then reweighed and the amount of additive applied was calculated.

The sleeves were then heat set by steam treating in an autoclave at 230°F. for 2 cycles of 5 minutes followed by 2 cycles at 270°F. for 5 minutes and 1 cycle at 270°F. for 8 minutes.

The sleeves were dyed to a celery shade in a dye bath composed as follows:

0.117% Celliton Yellow GA (C.I. Disperse Yellow 3) C.I. 11855

0.05% Cibacete Cerise GNB 0.037% Celliton Blue - Green BA (C.I. Disperse Blue 7) C.I. 62500

2.0% Trisodium phosphate 0.5% Triton X-100, nonionic surfactant by Rohm & Haas Co.

The sleeves were held at boil 1 hour.

The dyed sleeves were then exposed to three cycles of ozone in an atmosphere of 20 parts per 100,000,000 of ozone in an atmosphere of 104°F., at a relative humidity of about 90%. A cycle is that exposure which is completed when the internal nylon standard, dyed Avocado, has faded sufficiently to give a $\Delta E$ of 2.8. The measurement of $\Delta E$ is discussed under the "Description of the Preferred Embodiments".

The lightfastness was determined by exposure to xenon lamp at 145°F. for exposures of 20, 40, 60 and 80 hours and visual observation of hours exposure corresponding to first appearance of a significant break of color of the dyed sleeves. The material applied, the amount of coating, the ozone fading and xenon lightfastness are listed as follows:

TABLE I

| Material Applied | % Added | Ozone Fading $\Delta E$ 1 Cycle | 2 Cycles | 3 Cycles | Xenon Dye-Lightfastness* (145°F.) |
|---|---|---|---|---|---|
| 1. None - Control | 0 | 4.3 | 6.8 | 8.3 | 40 |
| 2. Bis-allyl thiourea of dimer diamine | 1.1 | 0.7 | 0.8 | 1.1 | 60 |
| 3. Bis-methyl thiourea of dimer diamine | 1.2 | 0.9 | 1.6 | 2.7 | 60 |
| 4. Bis-butyl thiourea of dimer diamine | 1.8 | 1.3 | 2.0 | 2.7 | 40 |
| 5. Tetra-allyl thiourea of dimer tetramine | 1.1 | 0.6 | 1.0 | 0.8 | 40 |
| 6. Tetra-heptyl thiourea of triethylenetetramine | 1.1 | 0.7 | 1.1 | 0.9 | 40 |
| 7. Penta-heptyl thiourea of tetraethylene pentamine | 1.1 | 0.4 | 0.4 | 0.9 | 40 |
| 8. Bis-allyl thiourea of menthanediamine | 1.2 | 1.2 | 2.3 | 3.5 | >60 |
| 9. Bis-heptyl thiourea of N,N'-diethyl hexanediamine | 1.7 | 1.0 | 1.3 | 2.2 | 40 |
| 10. Bis-methyl thiourea of trimethyl hexanediamine | 1.4 | 0.9 | 1.3 | 1.6 | 80 |
| 11. Bis-allyl thiourea of trimethyl hexanediamine | 1.0 | 0.6 | 1.0 | 0.8 | 40 |
| 12. Bis-heptyl thiourea of iminobispropylamine | 1.1 | 1.1 | 3.4 | 2.0 | 40 |
| 13. Bis-methyl thiourea of isophorendiamine | 1.0 | 0.5 | 1.0 | 1.0 | >80 |
| 14. Bis-allyl thiourea of isophoronediamine | 1.0 | 0.5 | 0.8 | 1.1 | >80 |

* = Hours to Significant Break

By dimer diamine is meant $H_2NDNH_2$ where D is a 36 hydrocarbon radical residue of a dimer acid, from which the amine is prepared. By dimer tetramine is meant

where D is as above. Amines may also be prepared from the trimer acids to make the polythioureas of this invention. The polythioureas of this invention are prepared by reacting alkylisothiocyanates with primary or secondary diamines, or polyamines such as dimer diamine, dimer tetramine and N'N'-dialkyl diamines or polyamines.

Dimer and trimer acids are viscous liquids produced by the polymerization of unsaturated $C_{18}$ fatty acids.

The commercial grades of dimer acid contain various specified amounts of trimer acid, as well as trace amounts of the monobasic fatty acids from which dimer acid is derived.

"Pure" dimer acid is a $C_{36}$ aliphatic, dibasic acid whose structure (see schematic) is essentially that of a long-chain dicarboxylic acid with two alkyl side chains ($B_3$ and $B_4$). The structure appears to contain at least one ethylenic bond and another linkage (X) resulting from the polymerization of the two unsaturated fatty acid molecules that form dimer acid. The exact nature of this linkage has not been completely defined: it may be as simple as a single carbon-to-carbon bond, or as complex as a cyclic structure, depending on factors such as the type of unsaturated $C_{18}$ fatty acid used, and process conditions such as temperature and catalyst type.

Schematic of Dimer Molecule

FIG. 1

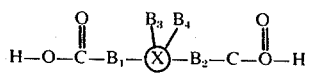

"Pure" trimer acid as a $C_{54}$ long-chain tricarboxylic acid whose structure is shown schematically below. The structure of trimer acid is similar to that of dimer acid, but accordingly more complex due to the additional 18 carbon atoms which it contains. Trimer acid has three or more alkyl side chains and two linkages at X in addition to at least one ethylenic bond.

Schematic of Trimer Molecule

FIG. 2

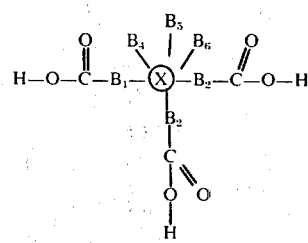

Theoretical Characteristics of Pure Dimer and Trimer Acid

TABLE II

|  | Dimer Acid | Trimer Acid |
|---|---|---|
| Number of carboxyl groups | 2 | 3 |
| Number of carbon atoms | 36 | 54 |
| Approx. molecular weight | 565 | 850 |
| Approx. equivalent weight | 283 | 283 |

STRUCTURE OF COMPOUNDS LISTED IN TABLE I

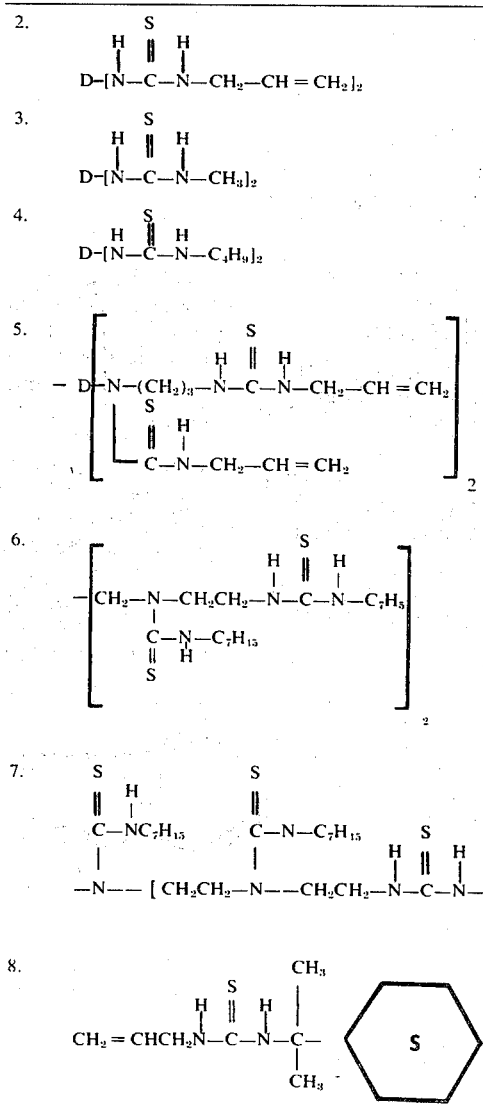

STRUCTURE OF COMPOUNDS LISTED IN TABLE I-continued

9. 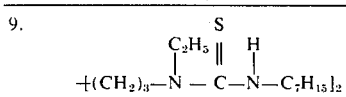

10. 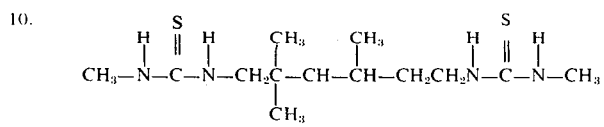

11. 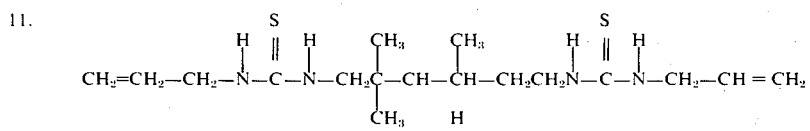

12. 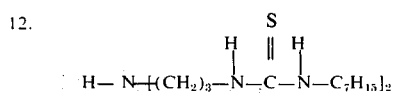

13. 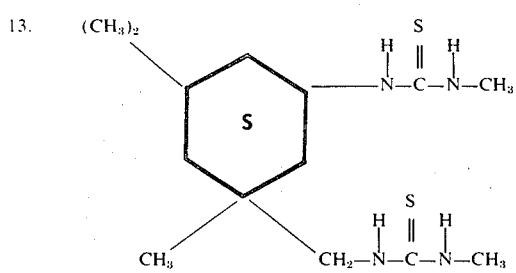

14. 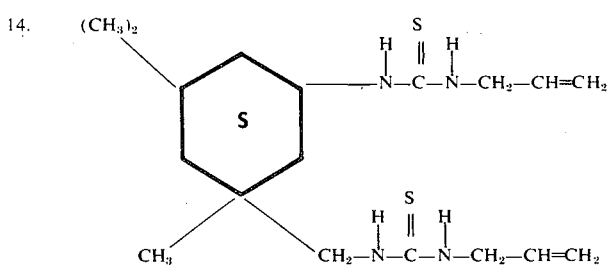

EXAMPLE 2

FOR CATIONIC DYED SLEEVES

Polymer made from caprolactam, having a formic acid relative viscosity of 46, about 81 sulfonic groups from sodium sulfoisophthalate, about 90 carboxyls and about 25 amine ends per million grams of polymer, was spun into yarn. The yarn, coated with a commercial aqueous spin finish was drawn at a draw ratio of 2.9. The yarn had a Y cross-section with a 3.2 modification ratio and each filament had a denier of 15.

The yarn was chopped into 7-inch lengths, carded and spun into staple yarn having a cotton count of 2. The yarn was knitted into sleeves.

The sleeves were cut into sections about 15 inches long and each section was weighed. The sleeves were then sprayed with 1 percent isopropanol solutions of the materials shown below. The sleeves were then allowed to dry overnight, and reweighed. The amount of material applied on the sleeves was based on the difference in weight between the coated and the uncoated sleeves, compared to the control. The sprayed sleeves were heat set by steam treating in an autoclave at 230°F. for 2 cycles of 5 minutes followed by two 5 minute cycles of steam treatment at 270°F. and one 8 minute cycle at 270°F.

The sleeves were dyed to a moss green in a dye bath composed as follows: , 0.3% Sevron Yellow 8GMF (DuPont) (C.I. Basic Yellow 53)

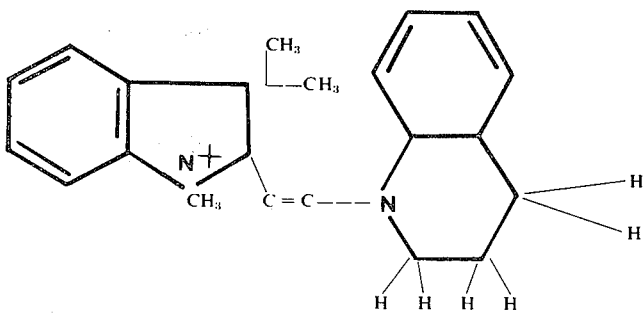

0.25% Astrazon Blue 3RL (Verona) (C.I. Basic Blue 47), C.I. 61111;

2.0% Hipochem PNH-11 amine salt of alcohol ester by Highpoint Chemical Company, 1.0% Hipochem CDL-60, nonionic surfactant by Highpoint Chemical Company, (chemical structure not available) and monosodium and/or disodium phosphate to adjust the pH to 7.0 ± 0.2.

The sleeves were then exposed to three cycles of ozone in an atmosphere of about 20 parts per 100,000,000 of ozone at a temperature of 104°F., at a relative humidity of 90%. A cycle is that exposure which is completed when the internal nylon standard, dyed Avocado, has faded sufficiently to give a $\Delta E$ of 2.8. The measurement $\Delta E$ is discussed under "Description of the Preferred Embodiments."

The additives, the amount applied and the results of ozone exposure and xenon lamp (145°F.) are listed as follows:

| Additive | % Added | ΔE Cycles 1 | ΔE Cycles 2 | ΔE Cycles 3 | Xenon (145°F.) Dyelightfastness Hours to Color Break |
|---|---|---|---|---|---|
| None - Control | 0 | 4.6 | 16.3 | 28.8 | 10 |
| Di-heptylthiourea of dimer diamine | 1.7 | 1.2 | 4.0 | 14.1 | 5 |
| Di-methylthiourea of dimer diamine | 1.7 | 1.4 | 3.9 | 16.5 | 10 |
| Di-butylthiourea of dimer diamine | 1.8 | 0.6 | 3.6 | 8.2 | 10 |

EXAMPLE 3

Dyed nylon sleeves similar to those of Example 2 were held in 0.5% solutions of the following thioureas for 20 minutes, and then dried in air for 24 hours. The additive pick-up, and the results of exposure to 3 cycles of the ozone fading test given above but with 80 pphm ozone instead of 20 pphm are as follows:

|   |   | 3 Cycles % Pick-Up | ΔE |
|---|---|---|---|
| 1. | Control |   | 21.0 |
| 2. | Pentaphenylthiourea of tetraethylenepentamine | 0.5 | 3.0 |
| 3. | Diphenylthiourea of hexamethylenediamine | 0.7 | 3.1 |
| 4. | Diphenylthiourea of ethylenediamine | 0.3 | 6.8 |

We claim:

1. A method for improving fastness of dyes when exposed to ozone in polycarbonamide fibers dyed with anthraquinone dyes consisting of
coating said fibers with a substance consisting essentially of a compound having a formula

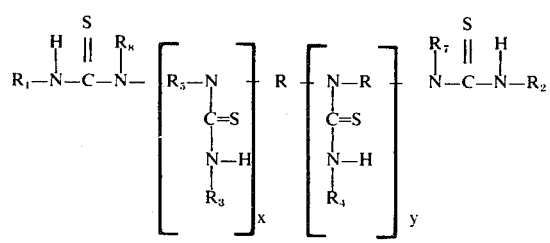

where $x$ and $y$ are 0, 1 or 2, R is a difunctional aliphatic hydrocarbon radical or

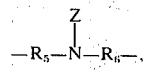

where Z is H or

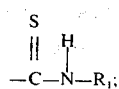

$R_1$, $R_2$, $R_3$, or $R_4$ are independently selected from phenyl or a monofunctional allyl or alkyl radical of 1 to 12 carbon atoms, $R_5$ and $R_6$ are $-(CH_2)_2-, -(CH_2)_3-$ or $$-CH_2\underset{\underset{CH_3}{|}}{C}H-$$

$R_7$, $R_8$ are independently selected from H or monofunctional allyl or alkyl radical of 1 to 12 carbon atoms, provided that when $x = 0$ and $R_1$ and $R_2$ are allyl then R must be a difunctional fatty acid residue moiety of 24 to 108 carbon atoms or a difunctional alkyl substituted cyclic aliphatic hydrocarbon, so that from about 0.5 to about 5 percent on weight of the fiber of the compound remains on said fiber after subsequent water treatment to substantially reduce rate of fading due to exposure to ozone of fabric of said dyed fiber.

2. The method of claim 1 wherein R is a difunctional fatty acid residue moiety of 24 to 108 carbon atoms.

3. The method of claim 2 wherein $R_1$, $R_2$, $R_3$, $R_4$ are lower allyl or alkyl having 1 to 8 carbon atoms.

4. The method of claim 1 wherein $R_1$, $R_2$, $R_3$ and $R_4$ are lower alkyl having 1 to 8 carbon atoms.

5. The method of claim 1 wherein said coating is applied prior to dyeing said fiber.

6. The method of claim 1 wherein said coating is applied subsequent to dyeing said fiber.

7. The method of claim 1 wherein said anthraquinone dyes are disperse dyes.

8. The method of claim 1 wherein said anthraquinone dyes are cationic dyes.

9. A polycarbonamide fabric dyed with anthraquinone dyes coated with from about 0.5 to about 5 percent on weight of fabric of a substance consisting essentially of a compound having the formula

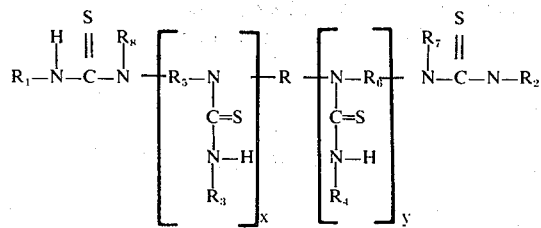

where x and y are 0, 1 or 2, R is a difunctional aliphatic hydrocarbon radical or

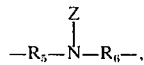

where Z is H or

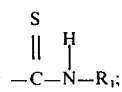

$R_1$, $R_2$, $R_3$ or $R_4$ are independently selected from phenyl or a monofunctional allyl or alkyl radical of 1 to 12 carbon atoms, $R_5$ and $R_6$ are $(CH_2)_2$, $(CH_2)_3$ or

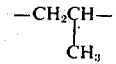

$R_7$, $R_8$ are independently selected from H or monofunctional allyl or alkyl radical of 1 to 12 carbon atoms, provided that when x equals 0 and $R_1$ and $R_2$ are allyl then R must be a difunctional fatty acid residue moiety of 24 to 108 carbon atoms or a difunctional alkyl substituted cyclic aliphatic hydrocarbon, said compound being substantative to polycarbonamides and whereby said compounds substantially reduce the rate of fading due to exposure of said fabric to ozone.

10. The fabric of claim 9 wherein said fabric is carpet.

* * * * *